Nov. 5, 1940.   O. W. RICHARDS   2,220,280
GAUGE
Filed Nov. 3, 1937   3 Sheets-Sheet 1
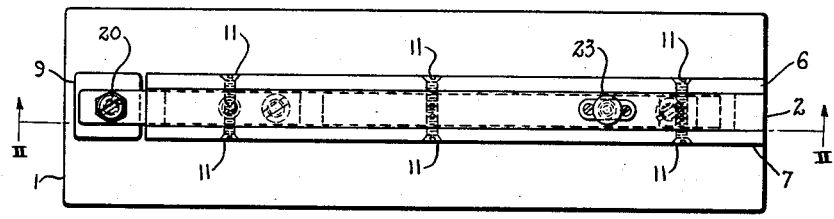
Fig. I
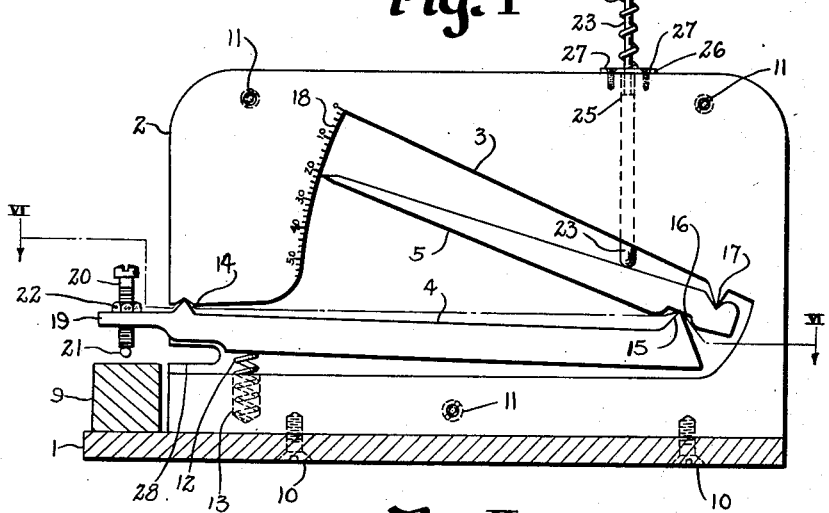
Fig. II
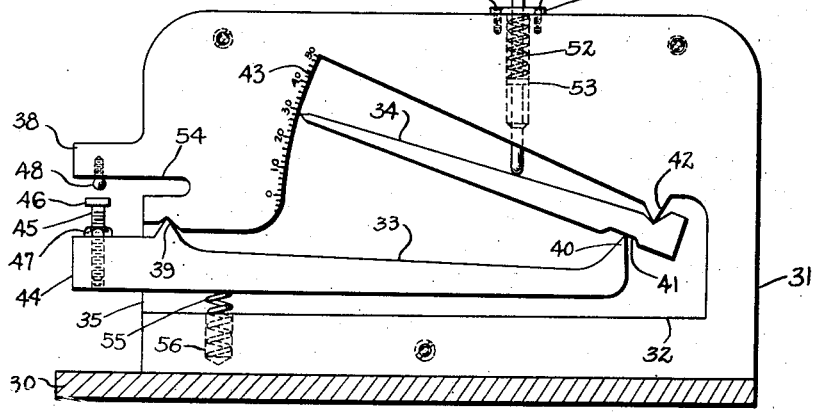
Fig. III
INVENTOR
OSCAR W. RICHARDS
BY
Harry H. Styll
ATTORNEY Nov. 5, 1940.     O. W. RICHARDS     2,220,280
GAUGE
Filed Nov. 3, 1937     3 Sheets-Sheet 2
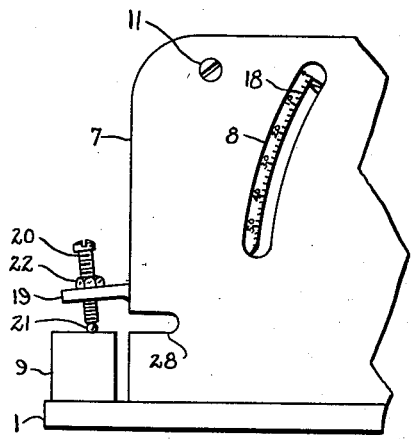
Fig. IV
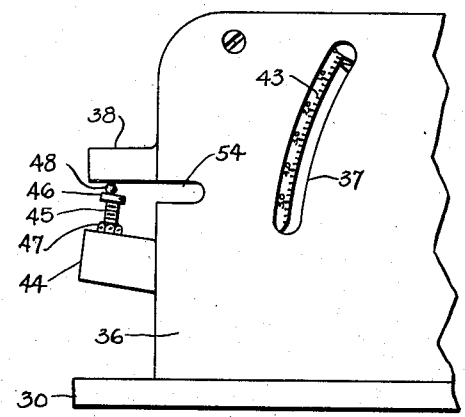
Fig. V
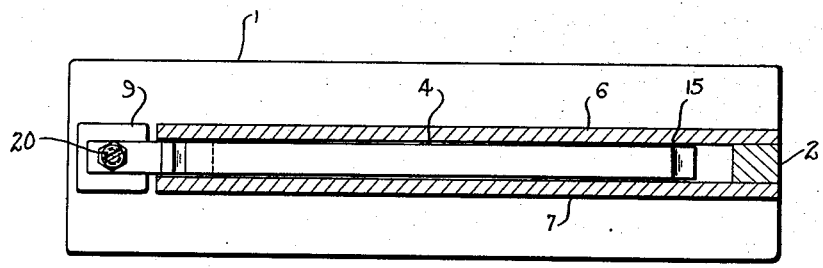
Fig. VI
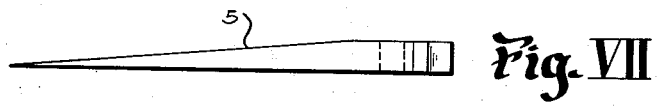
Fig. VII
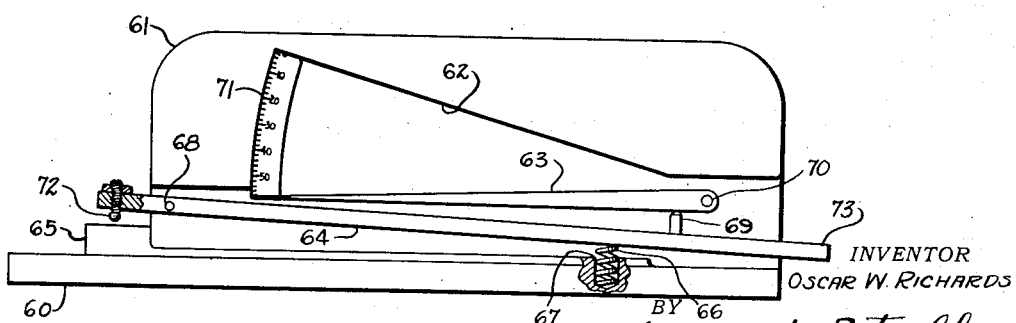
Fig. VIII
INVENTOR
OSCAR W. RICHARDS
BY Harry H. Styll
ATTORNEY

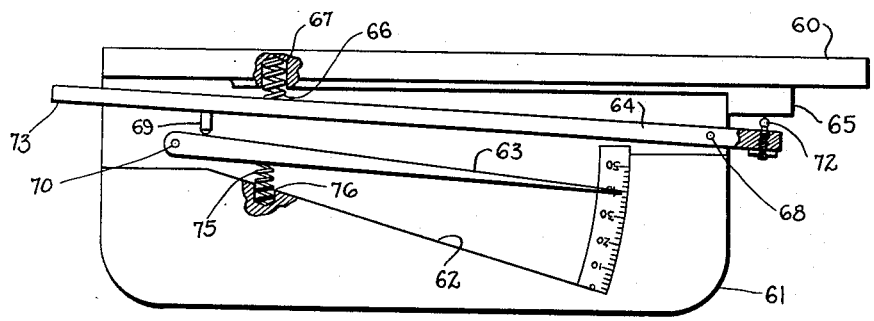
Fig. IX
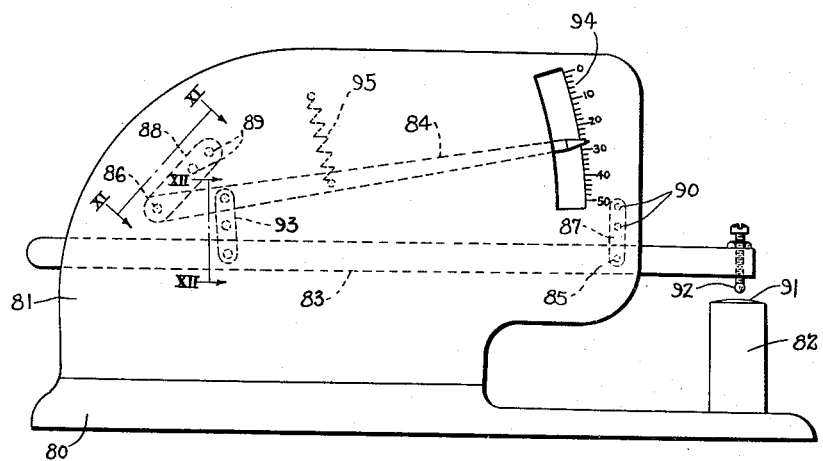
Fig. X
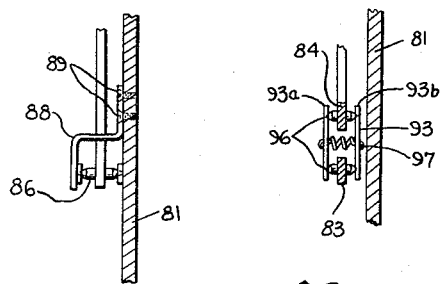
Fig. XI  Fig. XII
INVENTOR
OSCAR W. RICHARDS
BY
Harry H. Styll
ATTORNEY Patented Nov. 5, 1940

2,220,280

UNITED STATES PATENT OFFICE 2,220,280

GAUGE

Oscar W. Richards, Snyder, N. Y., assignor to Spencer Lens Company, Buffalo, N. Y., a corporation of New York Application November 3, 1937, Serial No. 172,585

1 Claim. (Cl. 33—148)

This invention relates to devices for gauging, and particularly relates to a device for gauging small flat pieces such as cover glasses.

One object of this invention is to provide an instrument which is small, compact, and simple, and which provides a large magnification of movement in relation to its size.

Another object is to provide a gauging device which is easy to assemble and disassemble and whose parts lend themselves to economical manufacture by the simplicity of their design.

Another object is to provide a gauging device with adjusting means between its gauging points, so that the instrument may be set at a desired thickness, and thus be used for inspection of articles all of which are approximately of this thickness.

Another object is to provide a gauging device having means for releasably opening the gauge point of the device.

Another object is to provide a gauging device having its parts so constructed and arranged that its levers are in overlying and overlapping relation to each other.

Another object is to provide a gauging device which is so constructed as to provide means by which the readings may be positively and accurately taken, and so that the reading means will be in such a relative position to the gauge point that both of these may be seen and used at the same time.

Another object is to provide a gauging device having supporting and actuating means so related to its active parts as to allow the use of the instrument in positions other than the normal.

Another object is to provide a gauging device whose active parts are carried by a single member.

Another object is to provide a gauging device having pivots for its active members which are designed to allow said members the maximum of ease of operation and at the same time the minimum of deviation from their proper courses.

Still another object is to provide a gauging device having contact members which are rounded or cupped to a degree commensurate with the particular uses of the instrument.

With reference to the drawings,

Fig. I is a plan view of the instrument;

Fig. II is a sectional view taken on lines II—II of Fig. I;

Fig. III is a view similar to Fig. II showing an alternate structure;

Fig. IV is a fragmentary side elevation of the device of Fig. I, showing the relatively movable contact, and the position of the scale reading slot;

Fig. V is a view similar to Fig. IV, using the alternate structure shown in Fig. III;

Fig. VI is a plan view of the contact lever of Fig. II, showing the knife edge bearing portion;

Fig. VII is a plan view of the indicating lever of Fig. II, showing its taper;

Fig. VIII is a side elevation of an alternate structure which utilizes one end of the contact lever to perform the function of the plunger in Figs. II and III. This device is shown with the front plate removed;

Fig. IX is a side view of a variation of the alternate structure shown in Fig. VIII. This is shown in inverted position to illustrate the action and support of the parts when the instrument is in that position;

Fig. X is a side elevation of another alternate structure in which a single supporting plate is used without either front or back plates;

Fig. XI is a cross section taken on line XI—XI illustrating the details of the bracket lever supports used in the structure illustrated in Fig. X, and Fig. XII illustrates the pivotal connecting link between the two levers as used in the structure illustrated in Fig. X.

This invention facilitates measurements of thickness by magnifying on the scales or other indicating means any variation in thickness of the articles being measured. In order to get equal magnification by using a single lever, the lever would have to be of a length prohibitive for the purpose of this invention. The drawings which illustrate my invention show two levers so arranged and with their fulcrum so positioned that large magnification is obtained without the necessity of a large instrument. This same arrangement of the levers provides a valuable feature in that it places the reading scale and pointer in such a relation with the gauging aperture that both the gauging aperture and the reading scale may be seen and viewed at the same time. A ball contact is provided on one of the abutments to assure single point contact, as well as long life. This obviates the danger of inaccuracy such as would enter if a flat contact were used, instead of the ball. This type of contact has the advantage of long wear over a type which has a single pointed contact.

As illustrated in Figs. I, II, and IV the device includes a base 1 supporting three plate-like members. The central and main plate 2 has a recess portion 3 in which are housed movable levers 4 and 5. The back and front of the recess 3 are closed in by the cover plates 6 and 7, the latter being provided with a scale viewing slot 8. The anvil 9, which acts as a stationary abutment is situated on the portion of the base extending forwardly of and in longitudinal alignment with the central plate 2, and in spaced relation therewith. The central plate 2 is attached to the base by means of screws 10, and the front plate 7 and the back plate 6 are attached to the central plate 2 by means of screws 11.

The central plate 2 contains the active parts of the device. The opening or recess 3 in the central plate 2 may extend through the entire width of that central plate, or only part way. In the opening 3 are supported and fulcrumed the contact lever 4 and the indicating lever 5, whose width (see Fig. VI) is a little less than that of the recess or opening in the central plate 2, so that they may move vertically without looseness and without excess friction with either the front plate 7 or the back plate 6. A spring 12 located in the hole 13 in the plate 2 supports the lever 4. This lever 4 has a fulcrum 14 and a knife edge engaging portion 15 for supporting the lever 5. The lever 5 has a bearing portion 16 to accommodate knife edge 15, and is fulcrumed at 17. The lever 5 acts as a pointer in conjunction with the scale 18. The engaging portion 15 and the fulcrum 17 are placed in close relation, and in such a manner that the lever 5 extends toward the contact end 19 of the lever 4, whereby the two levers are disposed in overlapping and overlying relation. The contact end 19 of the lever 4 extends out of the central plate 2 and over the anvil 9. A screw 20 with a ball tip 21 and a lock nut 22 extends through the lever 4 in a vertical line substantially over the center of the anvil 9. As will be explained later, the relation between the anvil 9 and the lever 4 may be reversed, as shown in Fig. III, or positioned in any other desired relation to produce the same result.

A plunger 23 extends down through the central plate 2 into the opening 3. The plunger 23 is attached to the central plate 2 by means of an attachment plate 26 and screws 27, and is held in normal position by the action of a spring 24 which holds a shoulder 25 against the plate 26.

As the plunger 23 is depressed, it acts upon the lever 5, forcing it down, and with it the knife edge portion 15 of the lever 4, thus opening the gauging aperture between the anvil 9 and the ball 21. While the gauging aperture is open, the piece to be gauged may be positioned between the contacts 9 and 21. The plunger 23 is then released, and the ball 21 allowed to contact the piece to be gauged. This contact is due to the action of the springs 12 and 24. The thickness of this piece may then be determined by looking through the slot 8 in the front plate 7 and reading the pointer indication on the scale 18. The screw 20 in conjunction with the lock nut 22, may be adjusted to allow various size pieces to be inserted for gauging. The screw 20 may also be adjusted with the purpose of bringing the pointer 5 to zero on the scale 18 before the instrument is used. A slot 28 is formed in the front and back plates 7 and 6. The purpose of this slot is to allow the piece being gauged more room for positioning.

An alternate structure of similar design and operation is illustrated in Figs. III and V. As shown therein the device includes a base 30 supporting three plate-like members. The central and main plate 31 has a recessed portion 32 in which are housed the movable levers 33 and 34. The back and the front of the recess 32 are closed in by the cover plates 35 and 36, the latter being provided with a scale viewing slot 37. The anvil 38 is an integral portion of the central plate 31, and extends forwardly of same to act as a stationary abutment.

In the opening or recess 32 are supported and fulcrumed the contact lever 33 and the indicating lever 34. A spring 55 located in a hole 56 in the plate 31 supports the lever 33. This lever 33 has a fulcrum 39 and a knife edge engaging portion 40 for supporting the lever 34. The lever 34 has a bearing portion 41 to accommodate the knife edge 40 and is fulcrumed at 42. The lever 34 acts as a pointer in conjunction with the scale 43. The contact end 44 of the lever 33 extends out of the central plate 31 and beneath the anvil 38. A screw 45 with a contact head 46 and a lock nut 47 is positioned in the lever end 44 substantially under the center of the anvil 38. A ball contact 48 is attached to the anvil 38 so as to form the stationary contact.

A plunger 49 extends down through the central plate 31 into the opening 32. This plunger 49 is attached to the central plate 31 by means of an attachment plate 50 and screw 51, and is held in normal position by the action of a spring 52 which acts against the plate 50 and a shoulder 53. A slot 54 is formed in the central plate 31 and the front and back plates 36 and 35.

The normal positions of this alternate structure are the reverse of those shown in Fig. II. That is, the aperture between the contact members 48 and 46 is closed by upward movement, the plunger 49 is normally down, and the scale readings are reversed.

Another alternate structure is illustrated in Fig. VIII. This construction has a base 60, and a central or main plate 61 supported by said base and having a recessed portion 62 in which are housed the movable levers 63 and 64. The anvil 65 is also supported by the base 60, and is in the same position relative to the other parts of the device as the anvil 9 is to the device shown in Fig. II, and has a similar use.

In the opening 62 are supported and fulcrumed the contact lever 64 and the indicating lever 63. A spring 66, located in a hole 67 in the base 60 biases the lever 64 in a counter-clockwise direction. This lever is pivoted at 68 and has a lug for engaging the indicating lever 63 as shown at 69. The lever 63 is pivoted at 70 and cooperates with the lever 64 and the scale 71 to indicate the thickness being measured in the aperture 72. This aperture is opened by pressing down on the projecting end 73 of the contact lever 64. The scale in this instance reads in the same direction as the scale 18 in Fig. II.

This instrument is designed primarily for use in an upright position, as shown in Fig. VIII. However, it may easily be adapted for use in other positions, such adaptation requiring primarily provision for keeping the active parts in their proper positions and in proper cooperation. For instance, I show in Fig. IX an instrument identical with that shown in Fig. VIII, except in that it has in addition a spring 75, seated in a hole 76, and bearing on the pointer 63. This figure is shown in inverted position to emphasize the need and use of said spring.

Still another alternate structure is illustrated in Fig. X, in which a base 80 supports a plate-like member 81 and an anvil 82. The plate-like member in turn supports the contact lever 83 and the indicating lever 84 by means of the brackets 87 and 88. These brackets are each fixed to the plate-like member 81 by means of two screws as at 89 and 90. The levers 83 and 84 are pivoted to the brackets 87 and 88 by means of trunnions 85 and 86.

The anvil 82 acts as the stationary contact and its contacting surface 91 is slightly convex. This takes care of cover glasses whose surfaces are slightly non-uniform. The drawing shows this convex curvature greatly exaggerated, as usually the highest point is only a few thousandths of an inch above the edge level.

The movable contact 92 cooperates with the anvil 82 in measuring the thickness of the cover glass and this measurement is transmitted by way of the contact lever 83, through the link 93, and the indicating lever 84, to the pointer end of said indicating lever, which acts in conjunction with the scale 94 to indicate the result of the above mentioned measurement.

The system of levers in this structure (Fig. X) is normally kept at zero position by the tension spring 95.

The details of the bracket arrangement are shown in Fig. XI, while Fig. XII illustrates the assembly and function of the link 93, which has trunnion pivots 96 in each of the levers 83 and 84, as well as a spring 97 which acts as the binding member of the elements 93a and 93b of the link.

The feature of the adjustability of the gauging aperture when it is fully opened has the advantage that it may be used for inspection work. That is, for work which has thickness tolerances the gauging aperture could be set so that the pointer in full open position indicates the maximum thickness allowable; then the work pieces could be positioned in the gauging aperture, and the manner in which they fitted, or did not fit, would indicate whether or not these pieces would pass inspection.

This invention provides an anvil block as a stationary abutment which stands up from the base and out from the body of the instrument, thus allowing the work piece to be easily handled and positioned on the anvil between the contact abutments of which the anvil acts as one. This obviates the danger of dropping or of not properly positioning the piece to be measured. A slot may also be provided in the body of the device to allow more room for positioning the piece to be measured. The anvil block may be positioned either above or below the movable abutment, and in whatever relation to the main body of the instrument as is desirable for the particular use to which it is to be put.

A very important advantage of this invention is the simplicity of the structure with the resulting economy of manufacture, and also ease of assembly or disassembly. It will be noted that the four major parts of this device are extremely simple ones, that is, the base, the two sides, and the central portion all may be manufactured with very little difficulty. The remaining parts are simple ones and are also easy and economical to manufacture.

This invention also provides plunger means for opening the gauging aperture. This plunger means acts upon the levers in the line of direction of their normal movement, thus obviating the danger of displacing or otherwise damaging the levers by grasping the abutment with the hand to open the gauging aperture. This plunger device also serves another purpose, in that the gauging aperture may be held open while the work piece is being positioned.

While I have herein set forth certain preferred embodiments of my invention, it is understood that I may without departing from the spirit of the invention vary from the exact structural details within the scope of the appended claim.

Having described my invention, I claim:

A device for measuring thickness, including a body member, a contact lever and an indicating lever pivotally mounted on said body member, said body member having a substantially flat anvil thereon, said contact lever having at one end thereof a single point contact adapted to cooperate with said anvil and at the other end a knife edge bearing portion, said indicating lever having one end thereof adapted to pivotally engage said body member and to cooperate with said knife edge bearing portion and the other end adapted to act as an indicator, and a plunger member resiliently supported on said body member, for acting upon said indicator and contact levers to cause said single point contact to move relative to said flat anvil.

OSCAR W. RICHARDS.